United States Patent
Darrer

(10) Patent No.: US 8,994,943 B2
(45) Date of Patent: Mar. 31, 2015

(54) SELECTIVITY BY POLARIZATION

(71) Applicant: Infineon Technologies AG

(72) Inventor: Franz Darrer, Graz (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 13/690,025

(22) Filed: Nov. 30, 2012

(65) Prior Publication Data

US 2014/0152989 A1  Jun. 5, 2014

(51) Int. Cl.
*G01J 4/00* (2006.01)
*G01J 4/04* (2006.01)

(52) U.S. Cl.
CPC ........................................ *G01J 4/04* (2013.01)
USPC ......................................................... 356/369

(58) Field of Classification Search
CPC ....................................................... G01J 4/00
USPC ......................................................... 356/369
See application file for complete search history.

(56) References Cited

U.S. PATENT DOCUMENTS

| | | | | |
|---|---|---|---|---|
| 3,880,524 A * | 4/1975 | Dill et al. ....................... | 356/369 |
| 3,985,447 A * | 10/1976 | Aspnes ........................... | 356/369 |
| 5,757,671 A * | 5/1998 | Drevillon et al. ............... | 356/367 |
| 5,929,994 A * | 7/1999 | Lee et al. ........................ | 356/364 |
| 6,073,464 A * | 6/2000 | Boher et al. ..................... | 65/378 |
| 6,307,627 B1 * | 10/2001 | Vurens ............................ | 356/369 |
| 6,515,745 B2 * | 2/2003 | Vurens et al. .................. | 356/369 |
| 6,791,684 B2 * | 9/2004 | Ferrieu .......................... | 356/326 |
| 7,030,972 B2 * | 4/2006 | Donahue et al. ................ | 356/71 |
| 7,173,699 B2 * | 2/2007 | Xu et al. ......................... | 356/369 |
| 7,369,234 B2 * | 5/2008 | Beaglehole ...................... | 356/369 |
| 7,379,183 B2 * | 5/2008 | Mieher et al. .................. | 356/401 |
| 7,777,879 B2 * | 8/2010 | Baxter et al. .................... | 356/364 |
| 7,847,937 B1 * | 12/2010 | Bevis .............................. | 356/369 |
| 7,898,661 B2 * | 3/2011 | Xu et al. ......................... | 356/369 |
| 8,045,142 B2 * | 10/2011 | Kimba ............................ | 356/72 |
| 8,115,912 B2 * | 2/2012 | Kimba ............................ | 356/72 |
| 8,345,240 B2 * | 1/2013 | Kemp et al. .................... | 356/367 |
| RE44,007 E * | 2/2013 | Ferrieu ........................... | 356/326 |
| 8,659,765 B2 * | 2/2014 | Ando .............................. | 356/603 |
| 2002/0054290 A1 * | 5/2002 | Vurens et al. .................. | 356/369 |
| 2004/0046959 A1 * | 3/2004 | Meeks et al. .................... | 356/369 |
| 2004/0070767 A1 * | 4/2004 | Tobiason et al. ............... | 356/495 |
| 2010/0097606 A1 * | 4/2010 | Kemp et al. .................... | 356/367 |
| 2010/0194855 A1 * | 8/2010 | Mamiya .......................... | 348/42 |

* cited by examiner

*Primary Examiner* — Roy M Punnoose
(74) *Attorney, Agent, or Firm* — SpryIP, LLC

(57) ABSTRACT

Representative implementations of devices and techniques provide selectivity for imaging devices and systems. Polarization may be applied to emitted light radiation and/or received light radiation to select a desired imaging result. Using polarization, an imaging device or system can pass desired light radiation having desired information and reject unwanted or stray light radiation.

23 Claims, 4 Drawing Sheets

SELECTIVITY BY POLARIZATION

BACKGROUND

Imaging systems based on light waves are becoming more widely used for object detection as semiconductor processes have become faster to support such systems. Some imaging systems are capable of providing dozens of images per second, making such systems useful for object detection in changing environments. Due to their potentially small form factor and potentially high signal fidelity, some imaging systems are well suited for application in many types of vehicles (cars, busses, trains, etc.). While the resolution of such imaging systems may vary, applications using these systems are able to take advantage of the speed of their operation.

A moving vehicle such as an automobile, for example, may use an imaging system to detect an object (a pedestrian, for example) in the path of the vehicle, to avoid hitting the object. For example, an imaging system may be employed on the front and/or the rear of the vehicle to detect objects in the forward or reverse paths of the vehicle respectively. However, if like imaging systems are employed on multiple vehicles, false images or erroneous outcomes may result when one imaging system detects the light emissions of a nearby or passing imaging system. For example, a first imaging system may detect the light emissions of an oncoming second vehicle's imaging system, and mistake the light emissions of the second system for a reflection of its own emissions. Further, direct emissions or reflections of light emissions from multiple other systems may produce unusable or inconsistent results when detected by a first system.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

For this discussion, the devices and systems illustrated in the figures are shown as having a multiplicity of components. Various implementations of devices and/or systems, as described herein, may include fewer components and remain within the scope of the disclosure. Alternately, other implementations of devices and/or systems may include additional components, or various combinations of the described components, and remain within the scope of the disclosure.

DETAILED DESCRIPTION

Overview

This disclosure is related to imaging systems (imaging systems using emitted electromagnetic (EM) radiation, for example) that are arranged to detect, recognize, and/or track objects in a preselected area relative to the imaging systems. For example, an imaging system associated with a vehicle may be used to detect an object in the path of the vehicle, or in an area near the vehicle. Additionally, the imaging system may track the object or provide an image of the object.

In some environments and/or implementations, multiple similar or identical imaging systems are deployed. This may be the case when multiple vehicles, for example, are equipped with like imaging systems, using similar or identical technologies. In such implementations, one or more polarizers may be used to distinguish the reflected light emissions of a first imaging device from incident and/or reflected light emissions from other imaging devices or from stray light sources.

Representative implementations of devices and techniques provide selectivity for imaging devices and systems. Polarization may be applied to emitted light radiation and/or received light radiation to select a desired imaging result. For example, using polarization, an imaging device or system can pass desired light radiation (e.g., light radiation having a predetermined polarization) and reject or attenuate unwanted or stray light radiation (e.g., light radiation not having the predetermined polarization).

In various implementations, planar and/or circular polarization may be used by an imaging device or system. In some implementations, the polarization of an imaging device may be adjustable, allowing the imaging device to selectively pass the desired light radiation and to selectively attenuate unwanted light radiation. In a further implementation, an imaging device may add the use of time-multiplexing and/or frequency multiplexing of emitted light radiation and/or received light radiation to provide additional selectivity.

Various implementations and arrangements for imaging systems, devices, and techniques are discussed in this disclosure. Techniques and devices are discussed with reference to example light-based imaging systems and devices illustrated in the figures. However, this is not intended to be limiting, and is for ease of discussion and illustrative convenience. The techniques and devices discussed may be applied to any of various imaging device designs, structures, and the like (e.g., radiation based, sonic emission based, particle emission based, etc.) and remain within the scope of the disclosure.

Implementations are explained in more detail below using a plurality of examples. Although various implementations and examples are discussed here and below, further implementations and examples may be possible by combining the features and elements of individual implementations and examples.

Example Imaging System Environment

Figure 1:
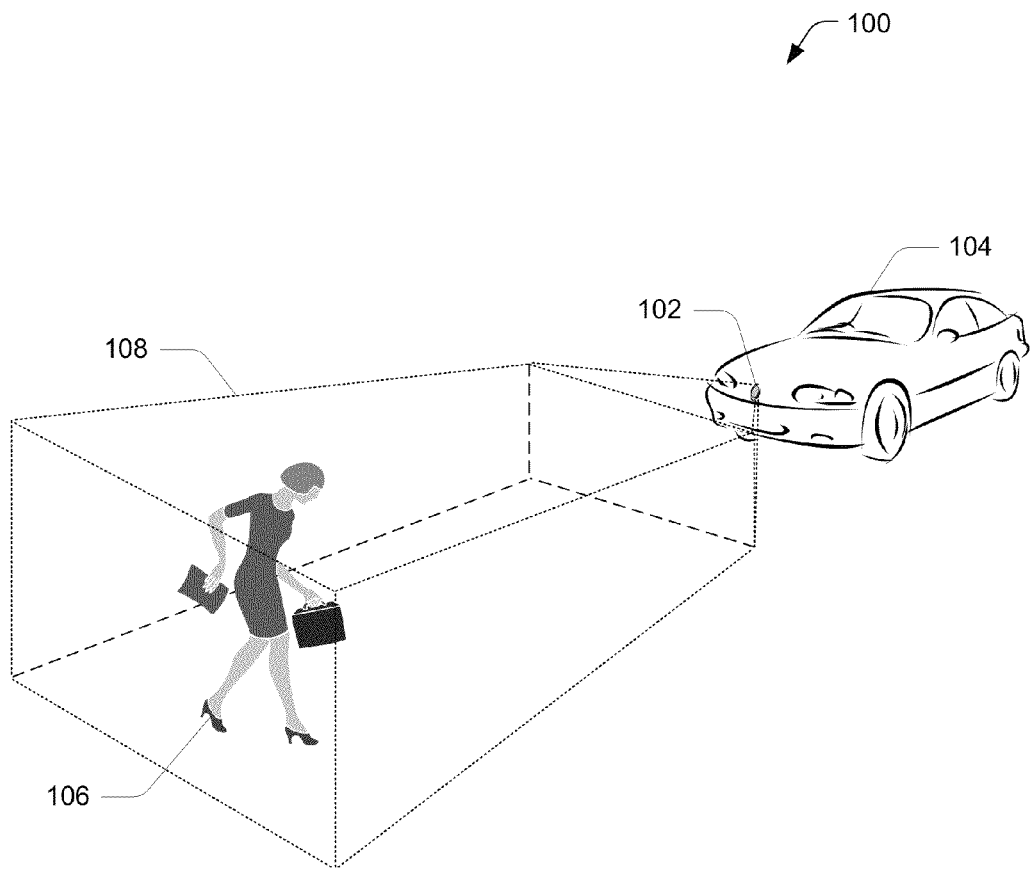
FIG. 1 is an illustration of an example application environment in which the described devices and techniques may be employed, according to an implementation.

FIG. 1 is an illustration of an example application environment 100 in which the described devices and techniques may be employed, according to an implementation. As shown in the illustration, an imaging system 102 may be applied with a vehicle 104 (e.g., automobile, bus, train, etc.), for example. In various other implementations, the imaging system 102 may be applied with other systems, devices, and the like (e.g., robotics, automation, surveillance systems, accessibility devices, safety systems, and so forth). For convenience within this disclosure, reference to a vehicle 104 also refers to all applications employing an imaging system 102 as mentioned above, and otherwise.

In various implementations, the imaging system 102 may be integrated with the vehicle 104, or may have some components separate or remote from the vehicle 104. For example, some processing for the imaging system 102 may be located remotely (e.g., cloud, network, etc.). In another example, some outputs from the imaging system may be transmitted, displayed, or presented on a remote device or at a remote location.

The imaging system 102 may be used to detect an object 106, such as a pedestrian, for example, in a preselected area 108. In various implementations, the imaging system 102 may be arranged to detect, recognize, and/or track the movement of the object 106. In one implementation, the imaging device is arranged to output an image (e.g., a two-dimensional or three-dimensional image) of the object 106. In an example implementation, an output of the imaging system 102 may be presented or displayed on a display device, for example (e.g., a mobile computing device, a smartphone, a vehicle information system, etc.).

An example object 106 may include any item that an imaging system 102 may be arranged to detect, recognize, track, and/or the like. Such items may include a person or an animal, for example. Other examples of an object 106 may include an obstruction, a target component, another vehicle, and so forth. In various implementations, the imaging system 102 may also be arranged to detect, recognize, and/or track a gesture or configuration of the object 106. A gesture or configuration may include any movement or position of the object 106 that is expressive of an idea. For example, a gesture or configuration may include positioning an object 106 in an orientation and/or a movement of the object 106 in a pattern (e.g., in an elliptical motion, in a substantially linear motion, etc.).

The imaging system 102 may be arranged to detect, recognize, and/or track an object 106 that is within a preselected area 108 relative to the imaging system 102. A preselected area 108 may be chosen to encompass an area that objects 106 may be within, for example. In one case, the preselected area 108 may encompass an area that represents an immediate or distant forward or reverse path for the vehicle 104. This area may be to the front, side, or around the imaging system 102, for example.

The illustration of FIG. 1 shows a preselected area 108 as a polygonal-like area in front of the vehicle 104. This is for illustration and discussion purposes, and is not intended to be limiting. A preselected area 108 may be any shape or size, may be located in front, back, side(s), top, and/or bottom of the vehicle 104, and may be chosen such that it will generally encompass desired objects when they are present, but not encompass undesired objects (e.g., other items that are not intended to be detected, recognized, tracked, or the like). In one implementation, as shown in the example of FIG. 1, the preselected area 108 may comprise a volume that is approximately one meter from the imaging device 102, and having a length of approximately to five meters, a width of approximately three meters, and a height that increases from approximately one meter to approximately two meters. In other implementations, the preselected area 108 may comprise various other shapes and sizes. In some implementations, the shape and size of the preselected area 108 is dependent on the application of the imaging device 102.

As discussed above, the techniques, components, and devices described herein with respect to an imaging system 102 are not limited to the illustration in FIG. 1, and may be applied to other imaging system and device designs and/or applications without departing from the scope of the disclosure. In some cases, additional or alternative components may be used to implement the techniques described herein. It is to be understood that an imaging system 102 may be implemented as stand-alone system or device, or as part of another system (e.g., integrated with other components, systems, etc.).

Example Imaging System

Figure 2:
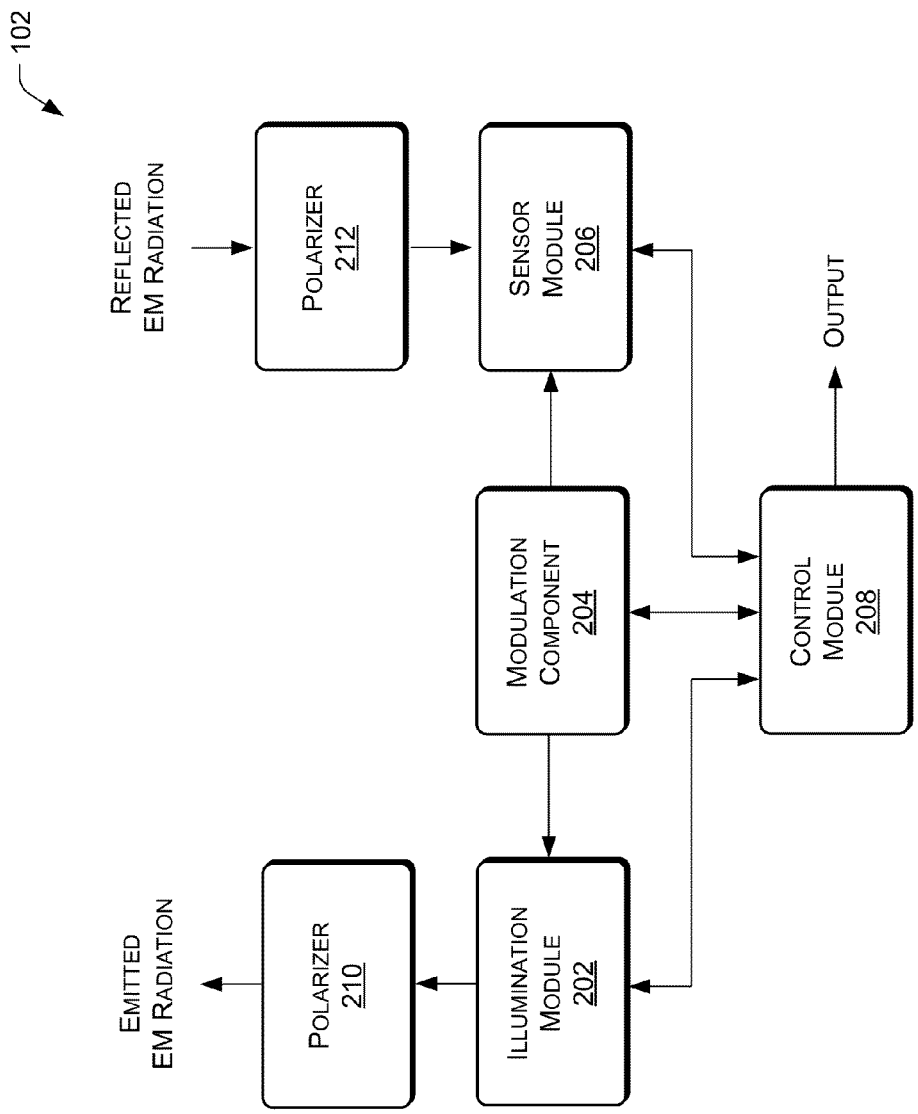
FIG. 2 is a block diagram of example imaging system components, according to an implementation.

FIG. 2 is a block diagram showing example components of an example imaging system 102, according to an implementation. As shown in FIG. 2, an imaging system 102 may include an illumination module 202, a modulation component 204, a sensor module 206, and a control module 208. Additionally, an imaging system 102 may include one or more polarizers 210 and 212. In various implementations, an imaging system 102 may include fewer, additional, or alternate components, and remain within the scope of the disclosure. One or more components of an imaging system 102 may be collocated, combined, or otherwise integrated with another component of the imaging system 102. For example, in one implementation, the imaging system 102 may comprise an imaging device or apparatus. Further, one or more components of the imaging system 102 may be remotely located from the other(s) of the components.

If included in an implementation, the illumination module 202 is arranged to emit electromagnetic (EM) radiation (e.g., light radiation) to illuminate the preselected area 108. In an implementation, the illumination module 202 is a light emitter, for example. In various implementations, the light emitter comprises a light-emitting diode (LED), a laser emitter, or the like. In one implementation, the illumination module 202 illuminates the entire environment (e.g., the preselected area 108) with each light pulse emitted. In an alternate implementation, the illumination module 202 illuminates the environment in pulses, stages, or scans.

In various implementations, different forms of EM radiation may be emitted from the illumination module 202. In some implementations, infrared light, or the like, is emitted. For example, the light radiation may comprise one or more modulated light pulses. The illumination module 202 may be switched on for a short interval, allowing the emitted light pulse(s) to illuminate the preselected area 108, including any objects 106 within the preselected area 108. Infrared light, for example, provides illumination to the preselected area 108 that is not visible to the human eye, and so is not distracting. In other implementations, other types or frequencies of EM radiation may be emitted that provide visual feedback or the like. As mentioned above, in alternate implementations, other energy forms (e.g., radiation based, sonic emission based, particle emission based, etc.) may be emitted by the illumination module 202.

In an implementation, the illumination module 202 is arranged to illuminate one or more objects 106 that may be present in the preselected area 108, to detect the objects 106. In one implementation, a parameter or characteristic of the output of the illumination module 202 (a polarization of the light radiation, for example) is arranged to be automatically, dynamically, and/or selectively adjusted. For example, in one implementation, as shown in FIG. 2, the imaging system 102 may include one or more polarizers 210 at the output of the illumination module 202. A polarizer 210 associated with the illumination module 202 may be arranged to polarize the light radiation in a predetermined polarization. In an implementation, the polarizer 210 is adjustable, and may be arranged to selectively polarize the light radiation to the predetermined polarization, or to any number of predetermined polarizations.

In various implementations, the polarizer(s) 210 may be arranged to polarize the light radiation in a planar-polarization having a predetermined angle with respect to horizontal (e.g., 45 degrees from horizontal, etc.). In other implementations, the polarizer(s) 210 may be arranged to polarize the light radiation in a circular-polarization having a predetermined direction of circular rotation (e.g., clockwise or counter-clockwise).

If included in an implementation, the modulation component 204 may be arranged to modulate the EM radiation emitted from the illumination module 202 and/or to modulate one or more components (e.g., photosensitive pixels, etc.) of the sensor module 206. In various implementations, the modulation component 204 may be arranged to correlate the modulation of the EM radiation with the modulation of the components of the sensor module 206 during time-of-flight operation (e.g., to calculate a distance of an object 106 from the imaging system 102 or to form a two-dimensional or three-dimensional image of the object 106, for example).

In various implementations, as shown in FIG. 2, the sensor module 206 is included in an imaging system 102. In one implementation, the sensor module 206 is an image sensor arranged to receive reflected light radiation from object(s) 106 in the predetermined area 108. For example, the sensor module 206 may be arranged to capture an image (e.g., two-dimensional image or three-dimensional image) of the object 106 within the preselected area 108 based on receiving the reflection of the light radiation.

In some implementations, the sensor module 206 may be comprised of multiple photosensitive pixels, for example. In one example, each of the multiple pixels is an individual image sensor. In such an example, a resulting image from the sensor module 206 may be a combination of the sensor images of the individual pixels. In an implementation, each of the plurality of photosensitive pixels are arranged to convert the reflection of the light radiation into an electrical current signal. In various implementations, the current signals from the pixels may be processed into an image by one or more processing components (e.g., the control module 208).

In an implementation, the sensor module 206 provides a measure of the time for light radiation to travel from the illumination module 202, to the object 106, and back to the sensor module 206. Accordingly, in such an implementation, the imaging system 102 comprises a three-dimensional range imaging device arranged to detect an object 106 within the preselected area 108 based on receiving a reflection of the light radiation and based on time-of-flight principles.

For example, in one implementation, the sensor module 206 is an image sensor arranged to detect an object 106 within the preselected area 108 based on receiving the reflected light radiation. The sensor module 206 can detect whether an object is in the preselected area 108 based on the time that it takes for the light radiation emitted from the illumination module 202 to be reflected back to the sensor module 206. Accordingly, in an implementation, the imaging system 102 is a detection system arranged to detect a three-dimensional object 106 within the preselected area 108, based on receiving a reflection of the light radiation and based on time-of-flight principles.

In one implementation, the sensor module 206 is arranged to determine a distance of a detected object 106 from the imaging system 102, based on receiving the reflected EM radiation. For example, the sensor module 206 can determine the distance of a detected object 106 by multiplying the speed of light by the time taken for the EM radiation to travel from the illumination module 202, to the object 106, and back to the sensor module 206. In one implementation, each pixel of the sensor module 206 is arranged to measure the time for a portion of the EM radiation to travel from the illumination module 202, to the object 106, and back to the pixel.

In one implementation, as shown in FIG. 2, the imaging system 102 may include one or more polarizers 212 at the input of the sensor module 206. A polarizer 212 associated with the sensor module 206 may be arranged to pass light radiation having the predetermined polarization of the polarizer(s) 210 associated with the illumination module 202 and to attenuate light radiation not having the predetermined polarization. In an implementation, the polarizer 212 is adjustable, and may be arranged to selectively pass light radiation having the predetermined polarization (including a reflection of the light radiation emitted by the illumination module 202, for example) and to selectively attenuate other light radiation not having the predetermined polarization.

In various implementations, the polarizer(s) 212 may be arranged to polarize the light radiation in a same planar-polarization as the polarizer(s) 210, having a same predetermined angle with respect to horizontal (e.g., 45 degrees from horizontal, etc.). In other implementations, the polarizer(s) 212 may be arranged to polarize the light radiation in a same circular-polarization as the polarizer(s) 210, having a same direction of circular rotation (e.g., clock-wise or counter clock-wise). In other words, in such implementations, each of the polarizers 210 and 212 are arranged to polarize light radiation in a same manner and direction/angle, such that light radiation passes through each of the polarizers 210 and 212 equally. In an implementation, the polarizer 210 and the polarizer 212 are concurrently adjustable to selectively pass light radiation having the predetermined polarization and to selectively attenuate light radiation not having the predetermined polarization.

In one implementation, the polarizer 210 and the polarizer 212 are one and the same polarizer for a given imaging system 102. For example, a polarizer may be arranged such that the illumination module 202 emits light radiation through the polarizer, and such that the sensor module 206 receives light radiation through the same polarizer.

If included in an implementation, the control module 208 may be arranged to provide controls and/or processing to the imaging system 102. For example, the control module 208 may control the operation of the other modules (202, 204, 206), and/or process the signals and information output by the other modules (202, 204, 206). In various implementations, the control module 208 is arranged to communicate with one or more of the illumination module 202, modulation component 204, and sensor module 206. In some implementations, the control module 208 may be integrated into one or more of the other modules (202, 204, 206), or be remote to the modules (202, 204, 206).

In one implementation, the control module 208 is arranged to adjust the polarizers 210 and/or 212. For example, the control module 208 may be arranged to adjust the polarization type, angle, direction, or the like. In various implementations, the control module 208 may be arranged to adjust the polarizers 210 and/or 212 manually, automatically, or dynamically.

In one implementation, the control module 208 is arranged to multiplex the light radiation emitted by the illumination module 202. For example, the control module 208 may be arranged to time-multiplex pulses of light radiation and/or frequency-multiplex the light radiation of the illumination module 202, to provide further selectivity to the imaging system 102. In another implementation, the control module 208 is arranged to time-multiplex and/or frequency-multiplex the sensor module 206 to correspond to the light radiation of the illumination module 202. In such an implementation, the sensor module 206 may be multiplexed substantially the same as the illumination module 202, such that a particular set of light pulses or a particular frequency of reflected light radiation is received by the sensor module 206 during a preselected interval of time. In various implementations, the control module 208 may multiplex the light radiation of the illumination module 202 and/or multiplex the sensor module 206 concurrent with polarizing the light radiation and/or the sensor module 206.

In an implementation, the control module 208 is arranged to detect, recognize, and/or track an object 106. In various implementations, the control module 208 may be programmed to recognize some objects 106 and exclude others.

In various implementations, the control module 208 may be arranged to calculate a distance of the object 106 from the imaging system 102, based on the measured time of the reflected EM radiation. Accordingly, the control module 208 may be arranged to convert the current signal output from the sensor module 206 (or from the pixels of the sensor module 206) to a distance of the object 106 from the imaging system 102. Further, in an implementation, the control module 208 may be arranged to convert the current signal to a three-dimensional image of the object 106.

In one implementation, the control module 208 is arranged to output the calculated distance and/or the three-dimensional image of the object 106. For example, the imaging system 102 may be arranged to output a distance, a three-dimensional image of the detected object 106, tracking coordinates of the object 106, and so forth, to a display device, to another system arranged to process the information, or the like.

In various implementations, additional or alternative components may be used to accomplish the disclosed techniques and arrangements.

Example Implementation

Figure 3:
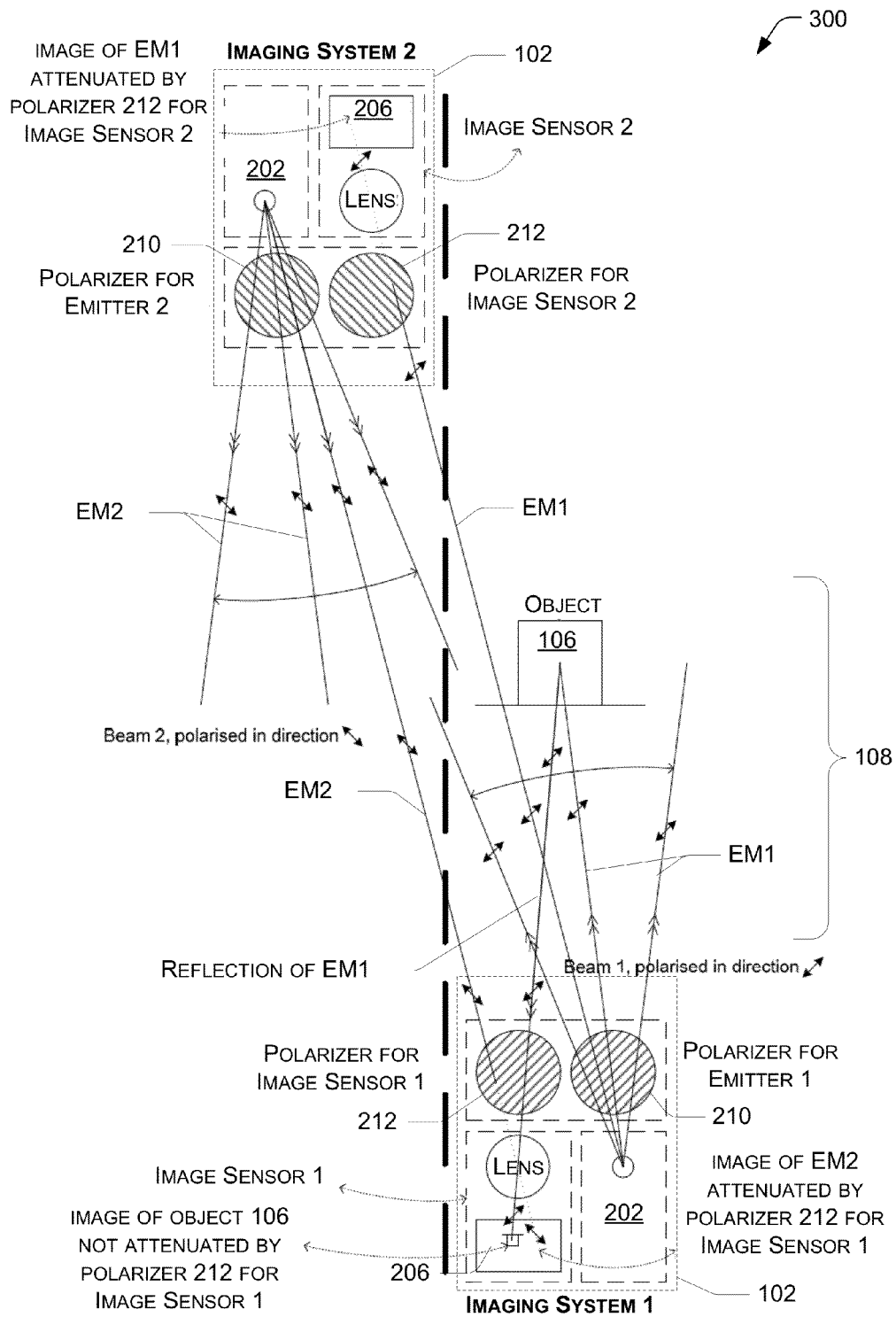
FIG. 3 is an illustration showing emitted and reflected light from at least two oppositely facing imaging systems, with polarization effects.

In one example implementation, as illustrated in FIG. 3, a system 300 may be arranged where the system 300 includes a plurality of imaging devices 102, where the imaging devices 102 may substantially similar or identical. In the system 300, the imaging devices 102 may be mounted to vehicles 104, or the like. In the case of the imaging devices 102 being mounted to vehicles 104, the dashed line in the center of FIG. 3 represents a center line on a road surface, or the like. In the system 300, each imaging device 102 of the plurality of imaging devices includes a polarized emitter 202 arranged to emit light radiation having a first polarization. For example, the light radiation may be arranged to illuminate at least a portion of a preselected area 108. In alternate implementations, the polarized emitter 202 may be comprised of an emitter 202 and one or more associated polarizers 210, or it may be comprised of an integrated emitter 202/polarizer 210 combination device, an emitter 202 with internal polarizing components (e.g., including internal polarizer(s) 210 within the emitter 202, for example), or the like.

Additionally, each imaging device 102 includes a polarized image sensor 206 arranged to receive a reflection of the light radiation having the first polarization and to reject light radiation having another polarization than the first polarization. In alternate implementations, the polarized image sensor 206 may be comprised of an image sensor 206 and one or more associated polarizers 212, or it may be comprised of an integrated image sensor 206/polarizer 212 combination device, an image sensor 206 having polarized or polarizable pixels, or the like. Further, the image sensor 206 is arranged to detect an object 106 within the preselected area 108 based on receiving the reflection of the light radiation having the first polarization.

In the example, each imaging device 102 within the system 300 is arranged to receive a reflection of light radiation emitted by the imaging device 102 at a first intensity and to receive light radiation and/or a reflection of light radiation emitted by another imaging device 102 of the plurality of imaging devices at a second, attenuated intensity.

FIG. 3 is an illustration showing emitted light radiation (EM1 and EM2) from at least two oppositely facing imaging systems 102 (imaging system 1 and imaging system 2, respectively) of an example system 300, with polarization effects. Also shown is a reflection of light radiation EM1 as reflected off object 106. FIG. 3 illustrates example advantages of the polarizers 210 and 212 in increasing the selectivity of the imaging systems 102, particularly when each imaging system 102 (imaging system 1, for example) is exposed to the light radiation of the other imaging system 102 (imaging system 2, for example).

Referring to FIG. 3, in an implementation, imaging systems 1 and 2 both emit light radiation (EM1 and EM2, respectively) from their illumination modules 202 (e.g., emitters 202). In the implementation, both emitters 202 emit the light radiation through a respective polarizer 210. In one example, the polarizers 210 for emitter 1 and emitter 2 are polarized substantially the same, having the same type and angle/direction of polarization. For example, the polarizers 210 may have a planar-polarization with a 45 degree angle from horizontal (bottom-left to top-right). Accordingly, the light radiation EM1 and EM2 are polarized the same as their respective polarizers 210, as shown in the illustration of FIG. 3 (e.g., shown with the small angled arrows superimposed on the light beams for EM1 and EM2).

Additionally, the polarizers 212 associated with the sensor modules 206 (e.g., image sensors 206) of the imaging systems 1 and 2 are polarized substantially the same as the polarizers 210 for the imaging systems 1 and 2, having the same type and angle/direction of polarization. In alternate examples, the polarizers 210 and 212 and the light radiation EM1 and EM2 may have other types of polarization (e.g., circular) or other angles or directions of polarization.

In the example illustrated in FIG. 3, the light radiation EM1 emitted from the emitter 202 for imaging system 1 is reflected off of an object 106 within the path (e.g., the preselected area 108) of the imaging system 1. Since the reflection of EM1 is polarized the same as the incident light radiation EM1, and the polarizer 212 associated with image sensor 1 is polarized the same as EM1, the reflection of EM1 passes through the polarizer 212 and is received by the image sensor 1. As shown in FIG. 3, the reflection of light radiation EM1 may be focused onto the image sensor 206 via one or more lenses. In an implementation, an image (e.g., a two-dimensional image or a three-dimensional image) of the object 106 is formed by the sensor module 206, based on receiving the reflected light radiation EM1.

Additionally, as shown in FIG. 3, the imaging system 1 is exposed to light radiation EM2 emitted from imaging system 2. However, in the example, the polarization angle of EM2 is approximately 90 degrees off from the polarization angle of polarizer 212 of imaging system 1, based on the direction that EM2 is originating from (e.g., since imaging system 2 is oriented in an opposite direction form imaging system 1). Due to the non-matching polarization angles, polarizer 212 for image sensor 1 attenuates or rejects light radiation EM2. Accordingly, a reduced intensity of EM2, if any of EM2, is received by image sensor 1.

Thus, a sensor module 206 with an associated polarizer 212 can be arranged to receive a reflection of light radiation emitted by an associated illumination module 202 at a substantially full intensity and also be arranged to receive light radiation other than the reflection of the light radiation emitted by its associated illumination module 202 at a reduced intensity. In other words, the sensor module 206 can be arranged to receive the reflection of the light radiation emitted by its associated illumination module 202 and to reject other light radiation emitted by other illumination module(s), based on the polarizer 212 associated with the sensor module 206.

This selectivity is also shown in FIG. 3, with imaging system 2 attenuating the light radiation EM1 emitted by imaging system 1. Again, since the imaging systems 102 are facing each other, their polarizers are at opposite angles to each other. This causes light radiation emitted from one imaging system 102 to be attenuated or rejected by the polarizers 212 of the other imaging system 102.

In various implementations, the polarizers 210 and 212 can be adjusted, which tunes the selectivity of the polarizers 210 and 212. For example, the polarizers 210 and/or 212 can be adjusted to vary the attenuation of different types or frequencies of EM radiation, EM radiation originating at various different angles, stray light radiation, or the like.

Representative Process

Figure 4:
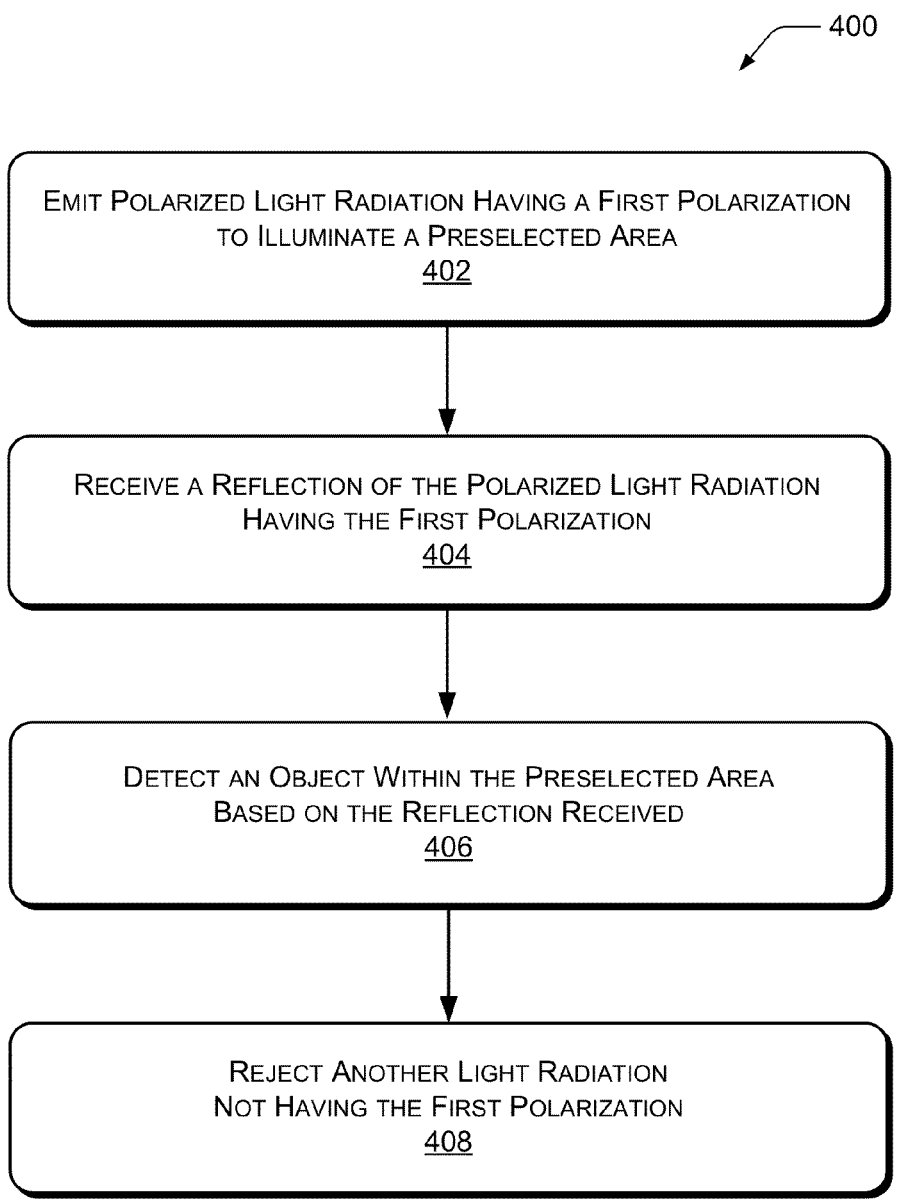
FIG. 4 is a flow diagram illustrating an example process for using polarization to improve selectivity of an imaging system, according to an implementation.

FIG. 4 illustrates a representative process 400 for using polarization to improve the selectivity of an imaging system (such as imaging system 102). The process 400 describes detecting one or more objects (such as an object 106) in a preselected area (such as preselected area 108). One or more polarizers may be used with a light emitter and/or an image sensor of the imaging system to improve selectivity of the imaging system. The process 400 is described with reference to FIGS. 1-3.

The order in which the process is described is not intended to be construed as a limitation, and any number of the described process blocks can be combined in any order to implement the process, or alternate processes. Additionally, individual blocks may be deleted from the process without departing from the spirit and scope of the subject matter described herein. Furthermore, the process can be implemented in any suitable materials, or combinations thereof, without departing from the scope of the subject matter described herein.

At block 402, the process includes emitting polarized light radiation to illuminate a preselected area (such as preselected area 108, for example). In various implementations, the preselected area may be relative to the imaging device (or to a vehicle associated with the imaging device, such as vehicle 104, for example). In an implementation, the polarized light radiation is emitted by an emitter (such as illumination module 202, or the like, for example) and passes through a polarizer (such as polarizer 210, for example). The polarizer is arranged to polarize the light radiation to a first polarization.

In various implementations, the light radiation may be polarized in a planar-polarization, a circular-polarization, or the like. Further, the light radiation may be polarized according to various angles with respect to horizontal or in either clockwise or counter-clockwise directions.

At block 404, the process includes receiving a reflection of the polarized light radiation having the first polarization. For example, the reflection of the polarized light radiation may be received by an image sensor (such as sensor module 206, for example). The polarized light reflection may be received by the image sensor via optics, a receiver, an antenna, or the like, for instance.

In an implementation, the reflection of the polarized light radiation is received by the image sensor by passing through a polarizer (such as polarizer 212, for example) associated with the image sensor. Accordingly, the reflection of the polarized light radiation passes through the polarizer at a substantially full intensity when the reflection of the polarized light radiation has a polarity substantially identical to that of the polarizer. In an implementation, the process includes adjusting a polarizer associated with an image sensor to selectively pass and/or selectively attenuate light radiation received by the image sensor.

At block 406, the process includes detecting an object (such as object 106, for example) within the preselected area based on the reflection received. In various implementations, the process may include detecting, recognizing, and/or tracking the object, for example. In one implementation, the process includes capturing a two-dimensional or a three-dimensional image of the object within the preselected area.

At block 408, the process includes rejecting another light radiation not having the first polarization. For example, another light radiation is attenuated or rejected by the polarizer associated with the image sensor when the other light radiation has a polarity different from that of the polarizer.

In an alternate implementation, the process includes time-multiplexing and/or frequency-multiplexing the polarized light radiation emitted by the emitter. In another implementation, the process includes time-multiplexing and/or frequency-multiplexing the image sensor to correlate with the multiplexed light radiation. The multiplexing of the light radiation and/or the image sensor may be performed concurrently to the polarization of the light radiation and/or the polarization of the image sensor.

In an implementation, the process includes arranging each of a plurality of discrete image sensing devices with a polarizer having a substantially same polarization, such that each image sensing device of the plurality of discrete image sensing devices receives a reflection of light radiation emitted by the image sensing device at a first intensity and receives light radiation and/or a reflection of light radiation emitted by another image sensing device of the plurality of discrete image sensing devices at a second, attenuated intensity.

In the implementation, the process includes adjusting the polarizer of one or more of the plurality of discrete image sensing devices to selectively pass some light radiation and selectively reject other light radiation.

In an implementation, the process includes time-of-flight techniques such as measuring a time from emitting the light radiation to receiving the reflection of the light radiation and calculating a distance of an object based on the measured time. In a further implementation, the process includes outputting imaging information, such as a distance, a two-dimensional or three-dimensional image of the detected object, tracking coordinates of the object, and so forth, to a display device, to another system arranged to process the information, or the like.

In alternate implementations, other techniques may be included in the process 400 in various combinations, and remain within the scope of the disclosure.

Conclusion

Although the implementations of the disclosure have been described in language specific to structural features and/or methodological acts, it is to be understood that the implementations are not necessarily limited to the specific features or acts described. Rather, the specific features and acts are disclosed as representative forms of implementing example devices and techniques.

What is claimed is:

1. An apparatus, comprising:
an emitter arranged to emit light radiation, illuminating at least a portion of a preselected area;
a first polarizer associated with the emitter and arranged to polarize the light radiation in a first polarization;
an image sensor arranged to detect an object within the preselected area based on receiving a reflection of the light radiation, the image sensor further arranged to detect the object within the preselected area based on time-of-flight principles; and
a second polarizer associated with the image sensor and arranged to pass light radiation having the first polarization and to attenuate light radiation not having the first polarization.

2. The apparatus of claim 1, wherein the image sensor is arranged to receive the reflection of the light radiation emitted by the emitter at a substantially full intensity and is arranged to receive light radiation other than the reflection of the light radiation emitted by the emitter at a reduced intensity.

3. The apparatus of claim 1, wherein the first polarizer and the second polarizer are adjustable to selectively pass light radiation having the first polarization and to selectively attenuate light radiation not having the first polarization.

4. The apparatus of claim 1, wherein the first polarizer and the second polarizer comprise one and a same polarizer.

5. The apparatus of claim 1, wherein the first polarizer and the second polarizer are arranged to provide a same planar-polarization.

6. The apparatus of claim 5, wherein the planar-polarization comprises a polarization having a predetermined angle with respect to horizontal.

7. The apparatus of claim 1, wherein the first polarizer and the second polarizer are arranged to provide a same circular-polarization having a same direction of circular rotation.

8. The apparatus of claim 1, wherein the image sensor is further arranged to capture an image of the object within the preselected area based on receiving the reflection of the light radiation.

9. The apparatus of claim 8, wherein the image sensor is further arranged to capture the image as a three-dimensional image.

10. The apparatus of claim 1, wherein the image sensor comprises a plurality of photosensitive pixels arranged to convert the reflection of the light radiation into a current signal.

11. A system, comprising:
an illumination module arranged to emit light radiation, illuminating at least a portion of a preselected area;
a first adjustable polarizer associated with the illumination module and arranged to selectively polarize the light radiation in a first polarization;
a sensor module arranged to receive a reflection of the light radiation and to detect an object within the preselected area based on receiving the reflection;
a second adjustable polarizer associated with the sensor module and arranged to selectively pass the reflection of the light radiation and to selectively attenuate another light radiation; and
a control module arranged to time-multiplex and/or frequency-multiplex the light radiation of the illumination module.

12. The system of claim 11, wherein the control module is arranged to time-multiplex and/or frequency-multiplex the sensor module to correspond to the light radiation of the illumination module.

13. The system of claim 11, further comprising a modulation component arranged to modulate the light radiation of the illumination module and/or one or more photosensitive pixels of the sensor module.

14. The system of claim 11, wherein the sensor module is arranged to receive the reflection of the light radiation emitted by the illumination module and is arranged to reject another light radiation emitted by another illumination module, based on the second polarizer.

15. The system of claim 11, wherein the system comprises a detection system arranged to detect a three-dimensional object within the preselected area, based on receiving a reflection of the light radiation and based on time-of-flight principles.

16. A method, comprising:
emitting polarized light radiation to illuminate a preselected area, the polarized light radiation having a first polarization;
receiving a reflection of the polarized light radiation having the first polarization;
detecting an object within the preselected area based on the reflection received;
rejecting another light radiation not having the first polarization; and
capturing a three-dimensional image of the object within the preselected area.

17. The method of claim 16, further comprising polarizing the light radiation in a planar-polarization or a circular-polarization.

18. The method of claim 16, further comprising adjusting a polarizer associated with an image sensor to selectively pass and/or selectively attenuate light radiation received by the image sensor.

19. The method of claim 16, further comprising time-multiplexing and/or frequency-multiplexing the polarized light radiation emitted.

20. The method of claim 16, further comprising arranging each of a plurality of discrete image sensing devices with a polarizer having a substantially same polarization, such that each image sensing device of the plurality of discrete image sensing devices receives a reflection of light radiation emitted by the image sensing device at a first intensity and receives light radiation and/or a reflection of light radiation emitted by another image sensing device of the plurality of discrete image sensing devices at a second, attenuated intensity.

21. The method of claim 20, further comprising adjusting the polarizer of one or more of the plurality of discrete image sensing devices to selectively pass some light radiation and selectively reject other light radiation.

22. A system, comprising:
a plurality of imaging devices, each imaging device of the plurality of imaging devices including:
a polarized emitter arranged to emit light radiation having a first polarization, illuminating at least a portion of a preselected area; and
a polarized image sensor arranged to receive a reflection of the light radiation having the first polarization and to reject light radiation having another polarization than the first polarization, and to detect an object within the preselected area based on receiving the reflection of the light radiation having the first polarization,
wherein each imaging device is arranged to receive a reflection of light radiation emitted by the imaging device at a first intensity and to receive light radiation and/or a reflection of light radiation emitted by another imaging device of the plurality of imaging devices at a second, attenuated intensity.

23. The system of claim 22, wherein each imaging device of the plurality of imaging devices is operably coupled to a vehicle.

* * * * *